United States Patent [19]
Fatzer et al.

[11] 3,969,131
[45] July 13, 1976

[54] COATED GRAPHITE MEMBERS AND PROCESS FOR PRODUCING THE SAME

[75] Inventors: Elmer G. Fatzer, Brunswick, Ohio; Cody P. Murphree, Decatur, Tex.

[73] Assignee: Westinghouse Electric Corporation, Pittsburgh, Pa.

[22] Filed: July 24, 1972

[21] Appl. No.: 274,697

[52] U.S. Cl............................... 428/316; 313/330; 313/345; 44/10 F; 44/10 J; 428/457; 428/408; 427/57; 427/316; 427/322
[51] Int. Cl...................... B44d 1/20; C23c 11/00
[58] Field of Search............ 117/106 R, 106 C, 228, 117/DIG. 8, 8, 47 H, 47 R; 313/330, 345; 44/10 F, 10 J

[56] References Cited
UNITED STATES PATENTS

| | | | |
|---|---|---|---|
| 2,978,358 | 4/1961 | Campbell | 117/106 R |
| 3,037,142 | 5/1962 | Griffoul | 313/330 |
| 3,243,636 | 3/1966 | Nineuil | 313/330 |
| 3,393,085 | 7/1968 | Howard | 117/106 R |
| 3,459,504 | 8/1969 | Bracken | 117/106 R |
| 3,471,314 | 10/1969 | Beatty | 117/106 R |
| 3,539,859 | 11/1970 | Bougle | 313/330 |
| 3,646,380 | 2/1972 | Hartl | 313/330 |
| 3,649,355 | 3/1971 | Hennig | 117/228 |
| 3,731,128 | 5/1973 | Haberrecker | 313/330 |
| 3,751,702 | 8/1973 | Dietz | 313/330 |

*Primary Examiner*—Leon D. Rosdol
*Assistant Examiner*—M. F. Esposito
*Attorney, Agent, or Firm*—Z. L. Dermer

[57] ABSTRACT

Composite members comprising a substrate of fine grained istropic graphite having a density of at least about 1.75 gr/cc, a coefficient of thermal expansion of from about 7.5 to 8.3 inch per inch per $°C \times 10^{-6}$, in which the grains are of a maximum particle size of less than 0.001 inch, and characterized by a relatively uniform distribution of many interconnected fine pores of an average diameter of about 5 microns and less, the pores extending to the surface of the member, and a selected refractory meatal carbide coating firmly bonded to and conforming to the surface of the isotropic graphite member, the refractory metal carbide coating and the isotropic graphite having closely matching coefficients of thermal expansion. Such coated members are particularly well suited for use as anodes and other electrical members, particularly for use at elevated temperatures. Rotating anodes for X-ray tubes comprising such members are an application. Processes for manufacture of such metal carbide coated isotropic graphite members are also disclosed.

14 Claims, 8 Drawing Figures

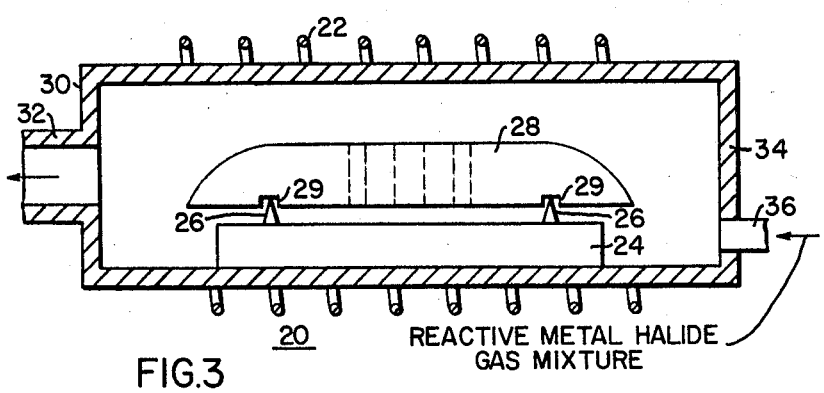
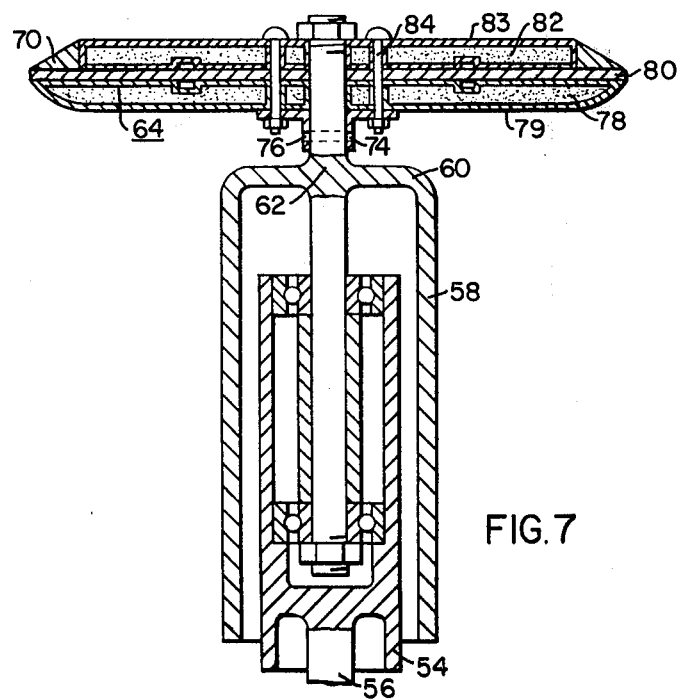

COATED GRAPHITE MEMBERS AND PROCESS FOR PRODUCING THE SAME

PRIOR ART

The manufacture of isotropic graphite bodies for various applications is well known in the art. A discussion of the manufacture of isotropic graphites is set forth for example in the AEC-NASA Tech Brief 71-10042, entitled "Producing Graphite With Desired Properties." Numerous commercial manufacturers produce isotropic graphites of various kinds.

Isotropic graphite bodies may be obtained commercially over a relatively wide range of characteristics. Thus, the grains or particles of the graphite body when a cross-section is viewed under the microscope and measured may vary from coarse grains of as much as 0.005 inch when measured along the average diameter down to fine grain products in which the maximum particle size is less than 0.001 inch. The coefficient of thermal expansion over the range of, for example room temperature to 1,000°C, may be from below 4.0 to as much as about 8.3 inch per inch per °C×10$^{-6}$. The density of such isotropic graphites may vary from about 1.5 to 1.9 grams per cc. Furthermore, all isotropic graphites have some pores present. The size, shape and distribution of the pores may vary from irregular large, randomly distributed pockets to relatively uniform fine pores. In many cases, the pores, both large and small, are completely enclosed and do not extend to the surface of the body or member produced therefrom, while in other cases a high proportion comprises an interconnected pore structure or the pores may have capillary passages, and thus such spaces or pores may extend to the surface of the body.

The manufacture of isotropic graphites generally comprises the steps of combining ground green coke, produced by oil refineries, which is calcined at elevated temperatures and then combined with pitch, usually ground solid pitch, in certain selected proportions. The mixture is then compressed at pressures of from 2 to 10,000 psi into bodies of various sizes. These bodies are usually given an intermediate heat treatment of from 1 to 24 hours at temperatures of from about 800° to 900°C. The resultant bodies are then placed in a graphitizing furnace where they are subjected to temperatures of the order of 2,400° to 2,800°C by passing an electrical current through the body for a period of time of the order of several hours. During this treatment, the carbon is converted to graphite and any volatile hydrocarbons, sulfides and other materials which gasify these elevated temperatures are driven off.

Such graphitized members have been employed for structural members for elevated temperature use, for dies for molding ceramics and metals, and as electrical anodes or the like in electroplating and other applications. Difficulties have been encountered in such applications of graphite bodies, particularly when subjected to electrical fields and especially in high vacuum systems. In a high vacuum, for example, such as that present in an X-ray tube, the graphite, particularly when bombarbed with electrons, tends to give off fine particles of graphite which coat the surfaces of the device and may impair its electrical properties. In addition, in isotropic graphites having a high proportion of closed pores, gases are slowly evolved by a diffusion process through graphite cell walls from the closed pores which have not been fully degassed in earlier processing and the vacuum is deteriorated thereby. No reasonable degasification procedure is known that can satisfactorily degas such closed pore graphites.

While it has been proposed to coat graphite members in order to seal the surfaces, the experience has been that such coatings have not adhered adequately to the graphite member because of loose particles, and for other reasons, so that when temperature gradients are set up in use, the applied coatings have peeled, cracked or broken off and unsatisfactory results have followed.

SUMMARY OF THE INVENTION

In accordance with this invention, it has been discovered that certain isotropic graphite members having a high density of at least about 1.75 grams per cc and a coefficient of thermal expansion of 7.5 to 8.3 inch per inch per degree Centigrade ×10$^{-6}$, over the range of 0° to 1,000°C, and characterized by fine grains of a maximum particle size of less than 0.001 inch and having a relatively uniform distribution of many interconnected fine pores extending to the surface of the member, may have applied thereto a refractory metal carbide coating which is firmly bonded to and conforms to the surface of the isotropic member. This arises in part by reason of the fact that the refractory metal carbide coating and the isotropic graphite member have closely matching coefficients of thermal expansion. A particular processing technique also provides that no loose particles are present between the coating and the substrate.

A process has been developed for initially heat treating the graphite member, machining or shaping the heat treated isotropic graphite member to predetermined shape or form, cleaning the shaped isotropic graphite member to remove all loose surface particles, and then applying by a gas deposition process a refractory metal carbide coating of at least 0.1 mil in thickness and preferably 0.3 mil in thickness, which coating will adhere very firmly to and conform to the surface of the isotropic graphite member to a degree unavailable in the art heretofore.

Such refractory metal carbide coated graphite members are eminently suited for use as electrical anodes. In particular, a portion of the anode structure in rotating anode X-ray tubes may comprise the metal carbide coated isotropic member associated in good thermal contact with metal ring, such as tungsten or a molybdenum alloy, against which the main portion of the electron beam impinges. Any stray electron beam radiation may impinge on the metal carbide coating without damage. The heat developed in the metal ring is readily conducted to the metal carbide coated isotropic graphite whose radiant energy emissivity is extremely high and thereby the heat is dissipated more efficiently and better than with other known materials. Ion plasma tubes may be produced from the refractory metal carbide coated isotropic graphite members. Electronic tubes, particularly large high power broadcasting and power control tubes, can employ the metal carbide coated isotropic graphite members of this invention advantageously.

For a better understanding of the nature and objects of the present invention, reference should be had to the following detailed description, in which the drawings comprise:

FIG. 1 is an elevation partly in cross section of a coated isotropic graphite member;

FIG. 2 is a block diagram of the process steps for producing the metal carbide coated graphite member;

FIG. 3 is a vertical cross sectional view through a coating apparatus;

FIG. 7 is a detailed cross sectional view of a composite rotating anode; and

DETAILED DESCRIPTION

Figure 4:
FIG. 4 is a photomicrograph of a coated conventional isotropic graphite.

Referring to FIG. 1, there is illustrated a composite structure 10 comprising a shaped member 12 which comprises fine grained isotropic graphite of a density of at least about 1.75 grams per cc, of a coefficient of thermal expansion of 7.5 to 8.3 inch per inch per °C×10⁻⁶, in which the grains are of maximum particle size of less than 0.001 inch and characterized by a relatively uniform distribution of interconnected fine pores 14 of an average diameter of about 5 microns and less, the pores extending to the surface of the member and a porosity equal to about 18 to 25% of the volume. Such high density, fine grained isotropic graphites have great strength at room temperature: from 16,000 to 28,000 psi in compression; a flexural strength of from 10,000 to 16,000 psi; and a tensile strength of from 6,000 to 10,000 psi. At elevated temperature these physical strengths increase and improved properties are realized.

It will be understood that such isotropic graphite bodies may exhibit even higher physical properties and thermal shock resistance properties, particularly if they are prepared from carbonaceous materials other than petroleum cokes and pitch. For instance, previously graphitized material may be finely ground and mixed with other binders such as furfural, or mixtures of furfural and pitch, and upon compressing and graphitizing high strength bodies may be obtained.

The surface of the isotropic graphite member 12 is coated with a refractory metal carbide of a thickness of at least 0.0001 inch, and preferably 0.0003 inch in thickness in order to assure all pores or openings are sealed and a relatively smooth outer surface of a metal carbide coating. The refractory metal carbide is selected from at least one metal carbide from the group consisting of niobium carbide, zirconium carbide, hafnium carbide, titanium carbide, tantalum carbide, molybdenum carbide, and chromium carbide. Duplex coatings, for example, an initial coating of niobium carbide of 0.5 mil thickness when overcoated with an 0.5 mil thickness of zirconium carbide, can be produced with improved properties, such as a high thermal emissivity.

To obtain the outstanding properties of the metal carbide coated-isotropic fine grain graphite as set forth herein, it is critical that the isotropic graphite have the characteristics above listed. The adherence and conformity of the metal carbide coating can only be obtained to the degree desired with substrates comprising these selected isotropic graphites. Experiments with other isotropic graphites whose properties depart significantly from the above have resulted in far less satisfactory composites. The latter composites had separated, cracked or spalled coating when subjected to high temperatures of 1,000° to 1,200°C, and when strains were applied they were unsatisfactory.

In order to secure optimum adherence of the refractory metal carbide coating to the isotropic graphite, it is important to process the graphite following the treatment steps as set forth in FIG. 2 of the drawing. Briefly, a block or large body of the isotropic graphite is first heat treated at step A in a reactive halogen gas for at least an hour at a temperature of from 1,700° to 2,400°C. Suitable reactive halogen gases may comprise chlorine, hydrogen chloride or the Freon gases, such for example as dichlorodifluoromethane, monofluorotrichloromethane, and difluorotetrachloroethane. Admixtures of these halogen gases with inert gases, an example of a suitable mixture being 50% argon and 50% (by volume) hydrogen chloride, have given good results. A preferred heat treatment temperature is in the range of 1,900° to 2,200C. The treatment time may extend up to several days with no detrimental results. This initial heat treatment as shown in block A in FIG. 2 has as its purpose to clean the graphite of materials that will react with the halogens and to remove various impurities.

In particular, the heat treatment of the isotropic graphite in the reactive halogen gas atmosphere will reduce the ash content of the graphite from the usual range of from 200 to 1,000 ppm, to a very low level. For example, fine grained isotropic graphites with an ash content totaling about 300 ppm comprising primarily compounds of iron, silicon, aluminum, vanadium and titanium with traces of magnesium, boron and nickel, when so heat heated in an argon-hydrogen chloride atmosphere had a final ash content of from 2 to 10 ppm.

Following the heat treatment of the isotropic graphite body in a halogen gas in step A of FIG. 2, the heat treated body is machined at step B to a predetermined or desired shape. The machining may include grinding, milling, filing, drilling, planing, or any operation otherwise producing the desired shape and surface condition for the member. Machining to precise dimensions and a smooth surface is readily accomplished because of the extremely fine grain texture of the graphite body. For many purposes, the surface should be relatively smooth and of a roughness that does not exceed about 100 micro inches RMS.

The machining produces a certain quantity of more or less adherent fine particles or dust, as well as partially loosened particles, on the surface of the member. Therefore, it has been found necessary to subject the shaped member to a surface cleaning step indicated as C in FIG. 2, which comprises ultrasonic cleaning of the graphite member, preferably in a halogenated liquid. Examples of suitable cleaning liquids are trichloroethylene and liquid Freons, such for example as trichlorotrifluoroethane. An example of processes accomplishing such ultrasonic cleaning and immersing the member in a trichloroethylene bath wherein it is subjected to violent agitation at an ultrasonic frequency of, for example, from 20,000 to 50,000 Hertz. The ultrasonic cleaning removes all loose particles from the surface of the isotropic graphite member and opens up any pores at the surface which have been plugged or closed by particles moved or pushed in during the machining steps.

The shaped and cleaned isotropic graphite member is now ready for the metal carbide coating to be applied in step D of FIG. 2. A number of different coating techniques are available for treating the isotropic graphite member. Two usable techniques comprise the following:

A. Heating the isotropic graphite member to an elevated temperature of the order of 1,500°C and higher and passing thereover a gas mixture comprising the vapors of a refractory metal halide, preferably the chlorides, for example, niobium chloride or zirconium chloride, admixed with a reducing gas such as hydrogen in order to reduce the metal halide at the elevated temperature. The gas mixture may also contain an inert gas as a diluent, an example of such inert gas being argon. In addition, hydrogen chloride may be present in the gas stream. The metal halides used can be one or more of the halogen compounds of titanium, zirconium, hafnium, niobium, tantalum, chromium and zirconium.

B. The isotropic graphite member may be preheated to a temperature of from 1,000° to 1,400°C. There is passed over the heated member a gas mixture comprising vapors of a refractory metal halide, for example titanium chloride or hafnium chloride, admixed with hydrogen and a hydrocarbon gas, such for example as propane, ethane or methane. An inert or diluent nonreactant gas may be present in the gas mixture to control the metal carbide deposition rate or the graphite substrate.

In process A, the gas mixture adjacent the highly heated isotropic member will react to deposit on the graphite surface the refractory metal as a result of a reduction of the refractory metal halide by the hydrogen. The hot refractory metal deposited on the graphite body rapidly reacts with the immediately adjacent graphite to form the corresponding refractory metal carbide. Furthermore, at the elevated temperatures carbon will diffuse from the graphite member into the refractory metal carbide coating and, as additional refractory metal is deposited in successive increments, the diffused carbon will carburize the incrementally deposited metal to form the refractory metal carbide.

In process B, the reaction of the hydrocarbon, hydrogen and refractory metal halide gas occurs at the heated surface of the graphite body to deposit directly the corresponding refractory metal carbide. Consequently, little or no graphite is consumed from the graphite member as occurs in process A.

Referring to FIG. 3 of the drawing, there is illustrated a suitable apparatus for carrying out the deposition of the refractory metal carbide on the isotropic graphite members. The apparatus 20 comprises a non-reactive refractory tube 21, for example of quartz or similar material which is relatively inert to the effect of high frequency electrical fields. A high frequency induction coil 22 is disposed about the exterior of the tube 21. Within tube 21 is a support 24 of quartz, for example, having a plurality of pins or other point type projections 26 on which is placed the machined and cleaned isotropic graphite member 28 to be held in an exposed elevated position. The graphite member 28 is preferably, though not necessarily, prepared with a plurality of indentations 29 into which the projections 26 enter so as to position the member 28 for free flow of gases about all of the surfaces to be coated with the refractory metal carbide.

A removable closure 30 is applied to the one end of tube 21 to enable the graphite member 28 to be positioned within the tube and then the tube is closed. The closure 30 includes an exhaust gas outlet 32 out of which spent reaction gases are withdrawn. The other end of the tube 21 is provided with a closure 34 having an inlet tube 36 through which the mixture of refractory metal halide gas, reducing gas and inert gas may be introduced for flow over the isotropic graphite member. If desired, several separate tubes 36 may be provided, each introducing one of the gases with admixing taking place in the tube 21.

In operation, the shaped isotropic graphite member 28 is placed within the tube 21 upon the supports 26 and the tube is preferably swept out with a flow of a purifying gas, for example, pure argon gas, until all oxygen, moisture and the like gases have been removed. During the sweeping out process, the high frequency coil 22 is energized so that the graphite member is heated thereby and brought up to the desired reaction temperature. The hot graphite surface will assist in the removal of any adherent gaseous impurities. Thereafter, the desired reactive gas mixture is introduced into a tube and caused to pass over the cleaned graphite member to produce the desired refractory metal carbide coating on the surfaces thereof. It has been found that the reactive gases will deposit metal carbide coatings even into the indentations 29, consequently all surfaces are fairly evenly coated.

While many graphite bodies have been produced in the industry nd designated as isotropic graphite bodies, they are available with a relatively wide variety of characteristics. Thus, for example, the density may vary from as little as about 1.5 to as much as 1.88 gr./cc and higher, the electrical resistivity in micro-ohms per centimeter may vary from as little as about 1,000 to about 6,000, the coefficient of thermal expansion may vary rom as little as 3.97 to as much as 8.3 inch per inch per °C$\times 10^{-6}$ and the particles size may vary from a maximum particle size of 0.003 to 0.005 inch or greater down to less than 0.001 inch. The porosity can also vary extensively and may comprise large, randomly distributed pockets which are completely enclosed to fine capillary pore networks which extend to the surface. The latter pore structure is particularly desirable for vacuum applications since such a graphitic structure degasses quite readily to a substantially gas free condition. As disclosed previously, for the practice of this invention there should be employed the high density (1.75 gr./cc. or greater), fine grained, fine pored graphites whose pores comprise networks extending to the surface of the body, as defined previously.

In order to illustrate graphically the differences between the various isotropic graphites with coatings applied thereto, reference should be had to FIG. 4 which is a photomicrograph at a magnification of 400×, one of the better conventional isotropic graphites with an applied carbide coating on the surface thereof. The large grain size and the relatively large, irregularly distributed pores are clearly apparent. This particular graphite does not constitute the type of graphite needed to practice this invention since the results will be relatively unsatisfactory.

Figure 5:
FIG. 5 is a photomicrograph of a high density, high thermal coefficient fine grained isotropic graphite.

FIG. 5 is a photomicrograph made at a magnification of 400× of the type of isotropic, high density, fine grain graphite with fine interconnecting pores and having the properties previously listed as critical, which isotropic graphite has been found to give outstanding results in the practice of the invention. The differences in the isotropic graphites are quite apparent, and that of FIG. 5 is clearly far better. This latter graphite is available as AXF-5Q grade graphite. An applied niobium carbide surface coating of a thickness of about 1.7 mils has been deposited on a surface of the graphite. It will be observed that the coating conforms closely to the graphite surface to which it has been applied. The coating adheres extremely well and tests have indicated that it will resist disruption or separation on being subjected to high temperature heating as well as to substantial mechanical strains.

Figure 6:
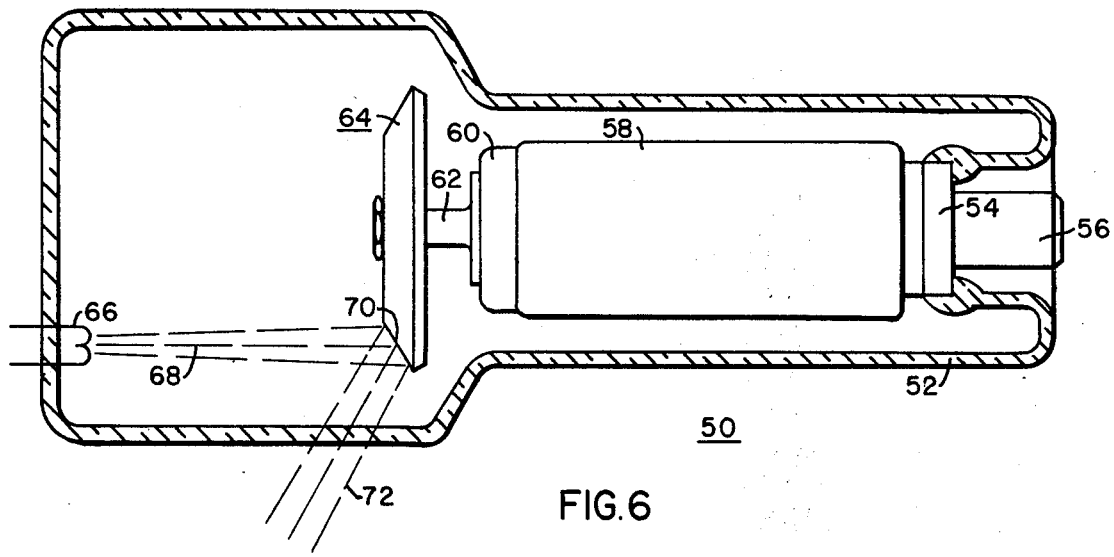
FIG. 6 is an elevation view of a rotating anode X-ray tube partly broken away.

Referring to FIG. 6 of the drawing, there is illustrated a rotating anode X-ray tube 50 embodying a rotating anode containing the refractory metal carbide coated isotropic graphite as a portion of the rotating anode structure. The rotating anode comprises a glass envelope 52 which is sealed at one end to a metal support 54 in the well known manner, with a metal stub 56 projecting from the support for mounting the tube in desired position on a suitable insulated base. A metallic sleeve 58 rotatably mounted on bearings attached to metal support 54, is adapted to coact with an alternating current field member (not shown) which is disposed outside the envelope 52 to cause rotation of the sleeve 58 when alternating current is passed through the field member. A rotating anode speed of from 1,800 to 10,000 RPM or more may be so produced. The sleeve 58 carries a collar 60 which terminates in a shaft 62, of molybdenum for example, to which is attached a rotating anode 64. In the upper end of the metal envelope 52 is disposed a filament 66, shown schematically, which provides a source of electrons when suitably energized by an electrical current, which electrons are accelerated by the application, between stub 56 and the filament 64, of a potential of the order of 50 kilovolts of 250 kilovolts to cause a beam 68 of electrons to be projected downwardly against the rotating anode where the main portion of the electron beam impinges of an angled face 70 of the rotating anode and upon impact therewith projects a beam 72 of X-rays.

Referring to FIG. 7, there is illustrated in detail the structure of the rotating anode 64 and its relationship to the sleeve 58 and shaft 62. A flanged collar 74 fixed by a pin 76 to the shaft 62, to which collar is fastened a lower circular disk 78 of isotropic graphite coated on all of its surfaces with the refractory metal carbide coating 79. A disk 80 of molybdenum, tungsten or other refractory metal is disposed upon and in close contact with the upper surface of disk 78. Mounted on the upper surface of the disk 80 is an outwardly beveled ring 70 of, for example, tungsten or rhenium coated molybdenum or other suitable electron beam target metal having the necessary refractory characteristics, and it is metallurgically bonded to the outer periphery of disk 80. Fitting tightly against and within the inner periphery of the peripheral ring 70 is a second composite disk 82 of the isotropic graphite with refractory metal carbide coating 83 of this invention. Fastening means 84 such as bolts of a refractory metal such as tungsten are employed to fasten the disks 78, 80 and 82 into tight contact with each other in order to obtain good thermal conductivity therebetween as well as to enable the shaft to rotate the assembly.

In operation, when the beam 68 of electrons impacts the cone surface of the refractory metal ring 70 intense heating takes place so that the ring which is spinning at, for example, 9,000 RPM, attains a temperature of the order of 300°C. The prompt and uniform dissipation of this heat has been a major problem inasmuch as the entire assembly within the glass envelope 52 is maintained in an extremely highly evacuated space and the heat is primarily dissipated by radiation. It has been found that the refractory metal coated isotropic graphite members will extract heat rapidly from the ring 70 and thence to the molybdenum disk 80 to which it is attached with high efficiency, so that the isotropic graphite member will be at a temperature of up to from 1,200° to 1,400°C. The thermal conductivity of the isotropic graphite is from 0.16 to 0.31 cal. per cm. per $cm^2$ per degree Centigrade, and the refractory metal carbide coatings 79 and 83 have excellent high radiation emissivity characteristics so that the heat is dissipated efficiently, by radiation. No dusting of the interior of the envelope 52 occurs, nor is there any significant evolution of any deleterious gases from the graphite member of the rotating anode structure 64.

Furthermore, the impingement of the electron beam 68 is not confined strictly to the face 70 since there is some lateral beam spreading taking place so that a part of the electron beam impinges on the nearby surfaces of the metal carbide coatings 83 and 79 on the members 82 and 78. It has been found that the electron beam does not degrade or deteriorate the metal carbide nor is there a separation of the coating from the graphite substrate. It will be understood that substantial centrifugal forces are present during the high speed rotation of the anode 64 which subjects the heated graphite substrate and the applied metal carbide coating to substantial strains which would tend to cause separation to occur if any inadequacy of the bonding between the two is present.

Figure 8:
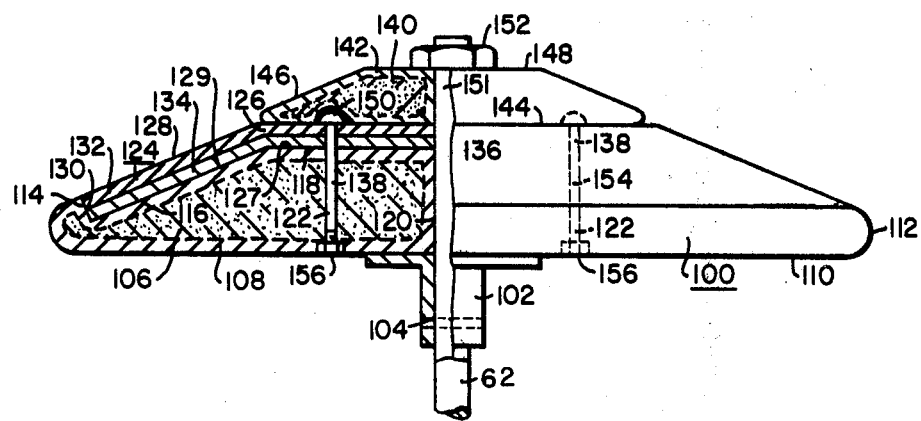
FIG. 8 is a detailed view partly in cross-section of a modified composite rotating anode.

Referring to FIG. 8, there is illustrated an alternate embodiment of a composite rotating anode 100 constructed in accordance with this invention. To the rotatable shaft 62 is affixed a closely fitting supporting flange sleeve 102 of molybdenum, for example, non-rotatably attached thereto by pin 104. A graphite supporting plate 106 having a metal carbide coating 108 is disposed on the flanged sleeve 102. The graphite plate 106 has a flat lower surface 110, which terminates in a rounded peripheral nose 112, and then leads at its upper surface to an angled shoulder 114 with a coned face 116 and a flat upper central face 118. A central bore 120 enables shaft 62 to pass therethrough, while a plurality of vertical holes 122 extend from the upper central face 118 to the flat lower surface 110 to enable fastening means to be introduced.

A circular composite metal plate 124, having a flat central portion 126 with a downwardly coned peripheral flange 128 terminating in a flat face 130 is proportioned and adapted to be placed on top of the graphite plate 108 so that the flat end 130 fits against and conforms to shoulder 114, and the bottom surface 127 of the flat central portion 126 fits against surface 118, while the coned bottom surface 129 of the coned peripheral flange 128 conforms to and fits against surface 116. This enables good thermal conductivity therebetween. An aperture 136 enables the metal plate 124 to be passed over shaft 62. A plurality of apertures 138 are aligned with apertures 122 of disk 106. The metal plate 124 may be of a unitary body of tungsten, or it may comprise a composite metal with an exterior surface 132 of 90 to 99% tungsten, balance 1 to 10% rhenium while the lower face is 90% molybdenum 10% tungsten.

An upper graphite plate 140 with a refractory metal carbide coating 142 has lower flat face 144, disposed to control and fit closely to the upper face of the flat central portion 126 of the metal plate 124. The upper surface of the plate 140 has a coned face 146 leading to a flat upper surface 148. Pockets 150 are provided in lower flat face 144 to fit against the heads of fastening means 154, while a central aperture 151 is present to accommodate the ends of shaft 62. A fastening nut 152 is provided to compact the upper graphite plate 140, the metal plate 124.

Studs or bolts 154 having heads fitting into the pockets 150 are provided to pass through apertures 138 and 122. Suitable fastening means 156, for example, threaded nuts can be applied to draw the metal plate 124 into a tight fit against the lower plate 106. The electron beam is directed against the upper surface of coned portion 128 whereby to produce X-rays. The intense heat of the metal plate 124 is conducted to other portions of the metal plate to the flat face 126, and thence heat is rapidly dissipated to the graphite plates 106 and 140, from which it is radiated into space.

It has been found that while metal carbide coatings as thin as 0.0001 inch thickness may have utility in some applications, a minimum of approximately 0.3 mil is necessary to seal the graphite surfaces completely and to prevent any porosity from extending through the coating. For situations requiring absolutely reliable sealing of the graphite surfaces, a metal carbide coating of a minimum thickness of approximately 0.5 mil applied by any of the techniques disclosed herein gives assurance that this condition is met. For some purposes, refractory metal carbide coatings of a thickness of up to 10 mils may be readily applied to the isotropic bodies in practicing the present invention.

The following examples are illustrative of the practice of the present invention.

EXAMPLE I

A body of isotropic graphite of a density of between 1.8 and 1.88, and corresponding to that illustrated in FIG. 5 of the drawing and which is obtainable in commerce, for example, as AXF-5Q isotropic graphite of Poco Graphite, Incorporated, was processed as shown in the FIG. 2 sequence. The member was heat treated for one hour at 2,000°C in an atmosphere comprising 50% of argon and 50% of hydrogen chloride by volume. The ash content of the graphite was reduced to less than 10 ppm. The isotropic graphite member was then machined to shape in the form of a disk and then cleaned by ultrasonic treatment in liquid trichloroethylene in an ultrasonic cleaning tank at 20,000 Hertz. The cleaned isotropic graphite disk was then placed in an induction coil heated tube furnace such as is shown in FIG. 3 of the drawing. A high frequency alternating current was applied to bring the temperature of the isotropic graphite disk to 1,600°C during which time an argon atmosphere was flowed over the surface to remove all surface moisture, oxides and other gaseous contaminants. When this 1,600°C temperature had been obtained, a stream of reactive gas was passed over the graphite disk for a total coating time of four hours. The gas flow in standard liters per minute comprised the following:

| | |
|---|---|
| argon | 35 |
| hydrogen | 3.4 |
| hydrogen chloride | 12½ |
| $NbCl_5$ | 3.5 pounds per hour |

A conforming and tightly adherent coating of a thickness of 1 mil of niobium carbide was deposited on all of the exposed surfaces of the isotropic graphite member. When tested on an anode in a beam of electrons as in an X-ray tube, the composite member exhibited excellent properties even at high temperatures.

EXAMPLE II

A member of isotropic graphite of the AXF-5Q grade whose surface was preliminarily cleaned and prepared as set forth in Example I, was disposed in the tube furnace and heated to a temperature of 1,900°C and, after a preliminary argon cleaning, was coated for a period of 4.5 hours by flowing over the surface thereof a gas mixture comprising in standard liters per minute:

| | |
|---|---|
| argon | 3.7 |
| hydrogen | 8.0 |
| hydrogen chloride | 29.4 |
| niobium chloride | 3.5 pounds per hour |

A 1 mil thick coating of niobium carbide tightly adherent to the graphite member resulted.

EXAMPLE III

A zirconium carbide coating was applied to an AXF-5Q grade isotropic graphite member prepared as in Example I by heating the member to a temperature of 1,650°C, and passing over the graphite member a gas flow, in standard liters per minute, as follows:

| | |
|---|---|
| argon | 83 |
| hydrogen | 11.5 |
| zirconium chloride | 2.0 pounds per hour |

In a coating time of 3 hours, a tightly adherent 1 mil thick zirconium carbide coating had been applied to the member.

EXAMPLE IV

Rotating anode disk members were prepared with a duplex coating by following the processes set forth in Examples I and III by first applying niobium carbide for approximately 1 hour and 45 minutes, whereby approximately 0.5 mil of niobium carbide was applied to the member. Then the gas stream was changed to apply zirconium carbide for 1 hour as set forth in Example III, whereby approximately 0.5 mil thickness of zirconium carbide overcoat was deposited on top of the niobium carbide. Tests of the resulting coated member indicated that this member had an extremely high thermal emissivity much greater than that of a comparable rotating anode member coated solely with a 1 mil thickness of niobium carbide.

In a similar manner to the preceding examples, coatings of one or more of the following refractory metal carbides may be applied to isotropic graphite members.

| Metal Carbide | Coefficient of Thermal Expansion — Average From 0°C to 1200°C | Melting Point °C |
|---|---|---|
| Titanium carbide | 7.74 | 3150 |
| Zirconium carbide | 6.73 | 3530 |
| Hafnium carbide | 6.59 | 3890 |
| Niobium carbide | 6.5 | 3760 |

-continued

| Metal Carbide | Coefficient of Thermal Expansion — Average From 0°C to 1200°C | Melting Point °C |
|---|---|---|
| Tantalum carbide | 6.29 | 3880 |
| Chromium carbide ($Cr_3C_2$) | 11.7 | 1895 |
| Molybdenum carbide ($MO_2C$) | 7.8 | 2565 |

It will be noted that the coefficients of thermal expansion are all close to that of the isotropic graphite. The chromium carbide, because of its substantially greater coefficient of thermal expansion and the lowest melting temperature, is the least desirable.

Refractory carbide coated members of the present invention are suitable for use as high temperature components in many applications, and particularly in electron tubes, as electron discharge machining electrodes, and as anodes in various electrical applications. The refractory metal carbide coatings have great wear resistance, do not react in neutral or inert, or reducing atmospheres. Their electrical conductivity is from 3 to 7 times that of the graphite substrate and their thermal conductivity is fully adequate.

We claim as our invention:

1. A composite structure comprising
   a. a substrate comprising a fine grained isotropic graphite member of a density of at least about 1.75 gr./cc., of a coefficient of thermal expansion of the order of 7.5 to 8.3 inch per inch per °C×10⁻⁶, in which the grains are of a maximum particle size of less than 0.001 inch, and characterized by a relatively uniform distribution of many interconnected fine pores of an average diameter of about 5 microns and less, the pores extending to the surface of the member, an ash content not exceeding about 10 ppm, and
   b. a refractory metal carbide coating of a thickness of at least 0.1 mil firmly bonded to and conforming to the surface of the isotropic graphite member, said coating comprising at least one metal carbide selected from the group consisting of niobium carbide, zirconium carbide, titanium carbide, hafnium carbide, tantalum carbide, molybdenum carbide, and chromium carbide,
   the refractory metal carbide coating and the isotropic graphite member having closely matching coefficients of thermal expansion.

2. The composite structure of claim 1, wherein the coating is at least 0.3 mil in thickness.

3. An anode suitable for use in an electrical device comprising
   a. a substrate comprising a fine grained isotropic graphite member of a density of at least about 1.75 grams per cc., and a coefficient of thermal expansion of the order of 7.5 to 8.3 inch per inch per °C×10⁻⁶, in which the grains are of a maximum particle size of less than 0.001 inch, and characterized by a relatively uniform distribution of many interconnected fine pores of an average diameter of about 5 microns and less, the pores extending to the surface of the member, and an ash content of less than about 10 ppm, a surface of the substrate being subject to a stream of electrons and high temperatures when in use in the electrical device, and
   b. the said surface of the substrate having applied thereto a refractory metal carbide coating of a thickness of at least 0.1 mil firmly bonded and conforming to said surface, said coating comprising at least one metal carbide selected from the group consisting of niobium carbide, zirconium carbide, titanium carbide, hafnium carbide, tantalum carbide, molybdenum carbide, and chromium carbide,
   the refractory metal carbide coating and the isotropic graphite member having closely matching coefficients of thermal expansion.

4. A rotating anode for an X-ray tube comprising a rotatable shaft and the anode being mounted on the shaft for rotation therewith, the anode comprising a composite member comprising
   a. a substrate comprising a fine grained isotropic graphite member of a density of at least about 1.75, and a coefficient of thermal expansion of the order of 7.5 to 8.3 inch per inch per °C×10⁻⁶, in which the grains are of a maximum particle size of less than 0.001 inch, and characterized by a relatively uniform distribution of many interconnected fine pores of an average diameter of about 5 microns and less, the pores extending to the surface of the member, and an ash content of less than about 10 ppm,
   b. a refractory metal carbide coating of a thickness of at least 0.1 mil firmly bonded to and conforming to the exposed surfaces of the graphite member, the coating comprising at least one metal carbide selected from the group consisting of niobium carbide, zirconium carbide, titanium carbide, hafnium carbide, tantalum carbide, molybdenum carbide, and chromium carbide, the refractory metal carbide coating and the graphite member having closely matching coefficients of thermal expansion, and
   c. a peripheral refractory metal ring in good thermal contact with the refractory metal carbide coated graphite member, the refractory metal ring adapted to have a beam of electrons projected thereagainst thereby heating it up, and the contacting refractory metal coated graphite member enabling the heat generated in the metal ring to be conducted to it for dissipation.

5. The rotating anode of claim 4, wherein the refractory metal coating is at least 0.3 mil in thickness.

6. A rotating anode for an X-ray tube comprising a rotatable shaft, in combination, a refractory metal disk adapted to be affixed to the shaft for rotation therewith, the outer periphery of the refractory metal disk having a surface to be exposed for impingement of a beam of electrons thereagainst during operation of the X-ray tube, at least one refractory metal carbide coated graphite body affixed to the lower surface of the refractory metal disk and in close conductive thermal contact with the metal disk whereby to enable heat developed by the electron beam to be conducted to the graphite body for radiant energy dissipation therefrom, the graphite body comprising
   a. a substrate comprising a fine grained isotropic member of a density of at least about 1.75, and a coefficient of thermal expansion of the order of 7.5 to 8.3 inch per inch per °C×10⁻⁶, in which the grains are of a maximum particle size of less than 0.001 inch, and characterized by a relatively uniform distribution of many interconnected fine pores of an average diameter of about 5 microns and less, the pores extending to the surface of the member, and an ash content of less than about 10 ppm, and b. a refractory metal carbide coating of a thickness of at least 0.1 mil firmly bonded to and conforming to the surface of the isotropic graphite member, the coating comprising at least one metal carbide selected from the group consisting of niobium carbide, zirconium carbide, titanium carbide, hafnium carbide, tantalum carbide, molybdenum carbide, and chromium carbide, the refractory metal carbide coating and the isotropic graphite substrate having closely matching coefficients of thermal expansion.

7. The rotating anode of claim 6, wherein a second refractory metal carbide coated graphite body is disposed in good conductive thermal contact with the upper surface of the refractory metal disk except for the surface to be exposed for impingement thereon of the beam of electrons, the second refractory metal carbide coated graphite body comprising:

a. a substrate comprising a fine grained isotropic graphite member of a density of at least about 1.75, and a coefficient of thermal expansion of the order of 7.5 to 8.3 inch per inch per $°C \times 10^{-6}$, in which the grains are of a maximum particle size of less than 0.001 inch, and characterized by a relatively uniform distribution of many interconnected fine pores of an average diameter of about 5 microns and less, the pores extending to the surface of the member, and b. a refractory metal carbide coating of a thickness of at least 0.1 mil firmly bonded to and conforming to the surfae of the isotropic graphite member, the coating comprising at least one metal carbide selected from the group consisting of niobium carbide, zirconium carbide, titanium carbide, hafnium carbide, tantalum carbide, molybdenum carbide, and chromium carbide, the refractory metal carbide coating and the isotropic graphite substrate having closely matching coefficients of thermal expansion.

8. The rotating anode of claim 6 wherein a refractory metal disk is affixed to the rotatable shaft, an outer ring of tungsten or a tungsten base alloy affixed to the periphery of the refractory disk, the outer ring having a surface to be exposed to a beam of electrons in the X-ray tube, at least one graphite body affixed in close thermal contact with one face of the refractory metal disk between the ring and the shaft, the graphite body comprising:

a. a substrate comprising a fine grained isotropic graphite member of a density of at least about 1.75, and a coefficient of thermal expansion of the order of 7.5 to 8.3 inch per inch per $°C \times 10^{-6}$, in which the grains are of a maximum particle size of less than 0.001 inch, and characterized by a relatively uniform distribution of many interconnected fine pores of an average diameter of about 5 microns and less, the pores extending to the surface of the member, and b. a refractory metal carbide coating firmly bonded to and conforming to the surface of the isotropic graphite member, the refractory metal carbide coating and the isotropic graphite substrate having closely matching coefficients of thermal expansion.

9. In the process of applying a refractory metal carbide coating to a graphite member to produce a composite structure, the steps comprising:

a. heat treating at a temperature of from about 1,700°C to 2,400°C an isotropic graphite body comprising fine grained isotropic graphite of a density of at least 1.75 and having a coefficient of thermal expansion of about 7.5 to 8.3 inch per inch per °Centigrade $\times 10^{-6}$, the graphite grains being of a maximum particle size of less than 0.001, and characterized by a relatively uniform distribution of many interconnected fine pores of an average diameter of about 5 microns and less, the pores extending to the surface of the body, the heating being applied for at least an hour in a halogen atmosphere, the heat-treatment purifying the body, b. machining the heat treated isotropic graphite body to a member of predetermined shape and surface condition, c. ultrasonically cleaning the machined body in a liquid cleaning fluid to remove loose surface particles, and d. vapor depositing on the surfaces of the cleaned isotropic graphite member a refractory metal carbide coating of a thickness of at least 0.1 mil.

10. The process of claim 9 wherein the refractory metal carbide vapor deposition step (d) comprises passing a reactive gas mixture of refractory metal halide vapor, hydrogen, and an inert gas over the graphite member while the graphite member is at a temperature of at least about 1,500°C whereby refractory metal is deposited on the graphite member from contact of the gas mixture therewith, the deposited metal and the graphite react to form the carbide and additional carbon diffuses into the applied coating to react with subsequently deposited refractory metal.

11. The process of claim 10, wherein the refractory metal halide is a halogen composed of at least one element of the group consisting of zirconium, hafnium, titanium, tantalum, molybdenum, chromium and niobium.

12. The process of claim 9, wherein the refractory metal carbide coating step (d) comprises heating the cleaned isotropic graphite member to at least about 1,000°C and passing over the heated member a reactive gas mixture comprising a refractory metal halide, hydrogen and a hydrocarbon, whereby a coating of the refractory metal carbide is deposited on the graphite member.

13. The process of claim 12, wherein the reactive gas mixture comprises an inert gas.

14. The process of claim 12, wherein the refractory metal halide is a halogen compound of at least one element of the group consisting of zirconium, hafnium, titanium, tantalum, molybdenum, chromium and niobium.

* * * * *